(12) United States Patent
Armstrong et al.

(10) Patent No.: US 6,422,342 B1
(45) Date of Patent: Jul. 23, 2002

(54) TAILGATE STEP FOR PICK-UP TRUCK BED ACCESS

(75) Inventors: Bradford Armstrong, Barrie; Willi Sitkei, Mississauga, both of (CA)

(73) Assignee: Decoma Exterior Trim Inc., Concord (CA)

( * ) Notice: Subject to any disclaimer, the term of this patent is extended or adjusted under 35 U.S.C. 154(b) by 0 days.

(21) Appl. No.: 09/678,038

(22) Filed: Oct. 3, 2000

Related U.S. Application Data
(60) Provisional application No. 60/157,445, filed on Oct. 4, 1999.

(51) Int. Cl.[7] .............................. E06C 5/00; E06C 9/00; B60R 3/00
(52) U.S. Cl. .................... 182/127; 182/88; 280/166; 296/62
(58) Field of Search .................... 182/127, 150, 182/92, 195, 91, 88; 280/163, 165, 166; 296/62

(56) References Cited

U.S. PATENT DOCUMENTS

| | | | | |
|---|---|---|---|---|
| 3,853,369 A | | 12/1974 | Holden | |
| 4,191,388 A | | 3/1980 | Barksdale | |
| 4,639,032 A | * | 1/1987 | Barbour | 296/62 |
| 4,846,487 A | | 7/1989 | Criley | |
| 4,848,821 A | | 7/1989 | Llewellyn | |
| 4,860,854 A | * | 8/1989 | Lodholz, Jr. | 182/88 |
| 4,958,979 A | * | 9/1990 | Svensson | 182/88 X |
| 5,028,063 A | | 7/1991 | Andrews | |
| 5,205,603 A | | 4/1993 | Burdette, Jr. | |
| 5,342,073 A | | 8/1994 | Poole | |
| 5,366,052 A | * | 11/1994 | Keh-Lin | 182/88 |
| 5,549,312 A | | 8/1996 | Garvert | |
| 5,687,813 A | | 11/1997 | Bensch | |
| 5,732,996 A | | 3/1998 | Graffy et al. | |
| 5,803,523 A | * | 9/1998 | Clark et al. | 296/62 X |
| 5,941,342 A | * | 8/1999 | Lee | 182/127 X |
| 5,944,332 A | * | 8/1999 | Lee et al. | 280/163 |
| 6,270,139 B1 | * | 8/2001 | Simpson | 296/62 |

* cited by examiner

*Primary Examiner*—Daniel P. Stodola
*Assistant Examiner*—Hugh B. Thompson
(74) *Attorney, Agent, or Firm*—Clark Hill PLC

(57) ABSTRACT

A stowable step has a housing, a U-shaped step platform and a sliding member pivotally engaging the step platform. The sliding member is slidably mounted within the housing for reciprocating movement between a retracted stowed position wherein the platform extends into the housing and a deployed position wherein the platform can pivot relative to the sliding member to a substantially vertical position.

11 Claims, 2 Drawing Sheets

US 6,422,342 B1

TAILGATE STEP FOR PICK-UP TRUCK BED ACCESS

This application claims the benefit of U.S. Provisional Application No. 60/157,445, filed Oct. 4, 1999.

FIELD OF INVENTION

The subject invention generally relates to a step assembly for access to a truck box or truck bed of a pick-up truck having a tailgate. More specifically, the invention relates to a tailgate step assembly for accessing the truck box or bed of the pick-up truck through the tailgate.

BACKGROUND OF INVENTION

Pick up trucks usually include a tailgate which is normally about 30 inches above the ground when the tailgate is in the open horizontal position. The elevated level of the tailgate makes entry and exit into and out of the truck box difficult for most people. Thus there have been many proposals for providing easier access to the truck bed in the form of folding steps. Examples of such steps include: U.S. Pat. Nos. 4,191,388; 4,846,487; 4,848,821; 5,028,063; 5,205,603; 5,342,073; 5,687,813; 5,732,996; and 5,944,332.

The prior art folding steps provide a step which can be folded from a stowed position to a deployed position presenting a step enabling access to the pick up truck bed. However, such steps are not packaged in a manner which hides the step when in the stowed condition or will present a tripping hazard when the tailgate is opened and the step kept in the stowed condition.

SUMMARY OF INVENTION

The disadvantages of the prior art may be overcome by providing a stowable step which slides into and out of a housing enabling the step to be stowed and deployed.

It is desirable to provide a housing having a low profile to minimize any intrusion of the stowable step into the cargo volume of the pick up truck cargo bed.

According to one aspect of the invention, there is provided a stowable step having a housing, a U-shaped step platform and a sliding member pivotally engaging the step platform. The sliding member is slidably mounted within the housing for reciprocating movement between a retracted stowed position wherein the platform extends into the housing and a deployed position wherein the platform can pivot relative to the sliding member to a substantially vertical position.

BRIEF DESCRIPTION OF THE DRAWINGS

Advantages of the present invention will be readily appreciated as the same becomes understood by reference to the following detailed description when considered in connection with the accompanying drawings wherein.

DETAILED DESCRIPTION OF THE PREFERRED EMBODIMENT

Figure 1:
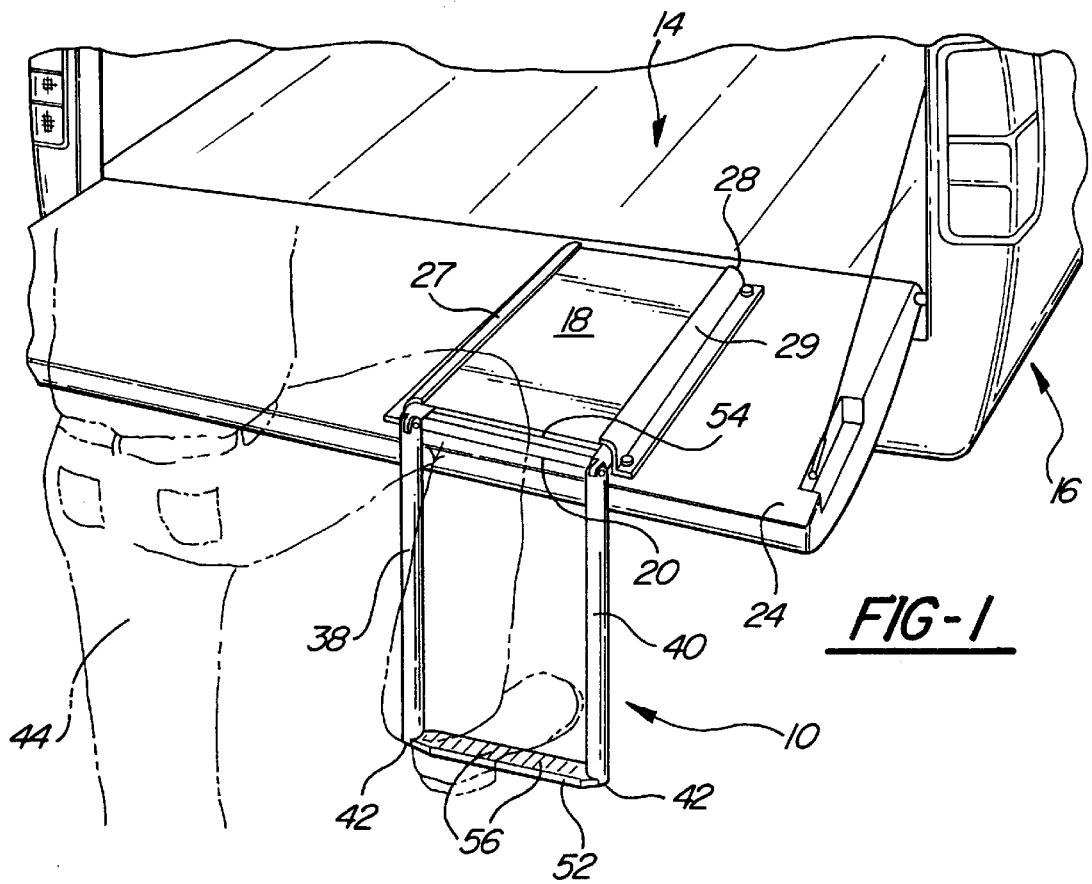
FIG. 1 is a perspective view of a step assembly of the present invention in an extended position.

The subject invention generally relates to a step assembly shown at 10 for providing access into a truck box or a truck bed 14 of a pick-up truck 16. The step assembly 10 will be described further hereinbelow in terms of the pick-up truck 16 and the tailgate step assembly 10. However, as appreciated, the step assembly 10 may be utilized for access into vehicles other than the pick-up truck 16.

The tailgate step assembly 10 includes a housing 18 having a bottom panel 20 and a cover 28. The bottom panel 20 is mounted to an inside surface 22 of a tailgate 24 of the pick-up truck 16. A plurality of screws 26 spaced about the outer periphery 12 of the housing 18 extend into the tailgate 24 of the pick-up truck 16 to mount the step assembly 10 thereon.

The housing 18 is manufactured from a generally durable material that is resistant to the 'wear and tear' typically associated with use of the pick-up truck 16. Cover 28 is contoured to hide the inner components of tailgate step assembly 10 within the housing 18, and to protect the tailgate step assembly 10 from damage due to movement of heavy cargo that may be stored within the truck bed 14 of the pick-up truck 16. Cover 28 is contoured to define slide channels 27, 29. The trailing edge of cover 28 has an flange presenting a stop 54.

Figure 3:
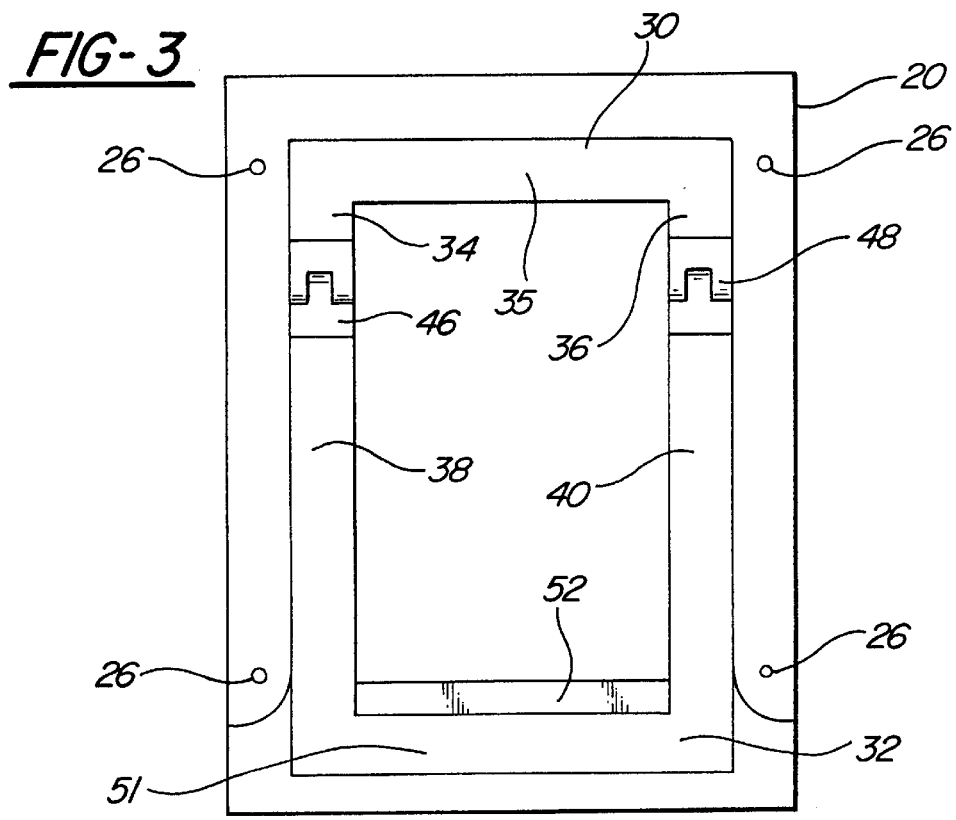
FIG. 3 is a top view of the step assembly, with cover removed, in the stored position.
Figure 2:
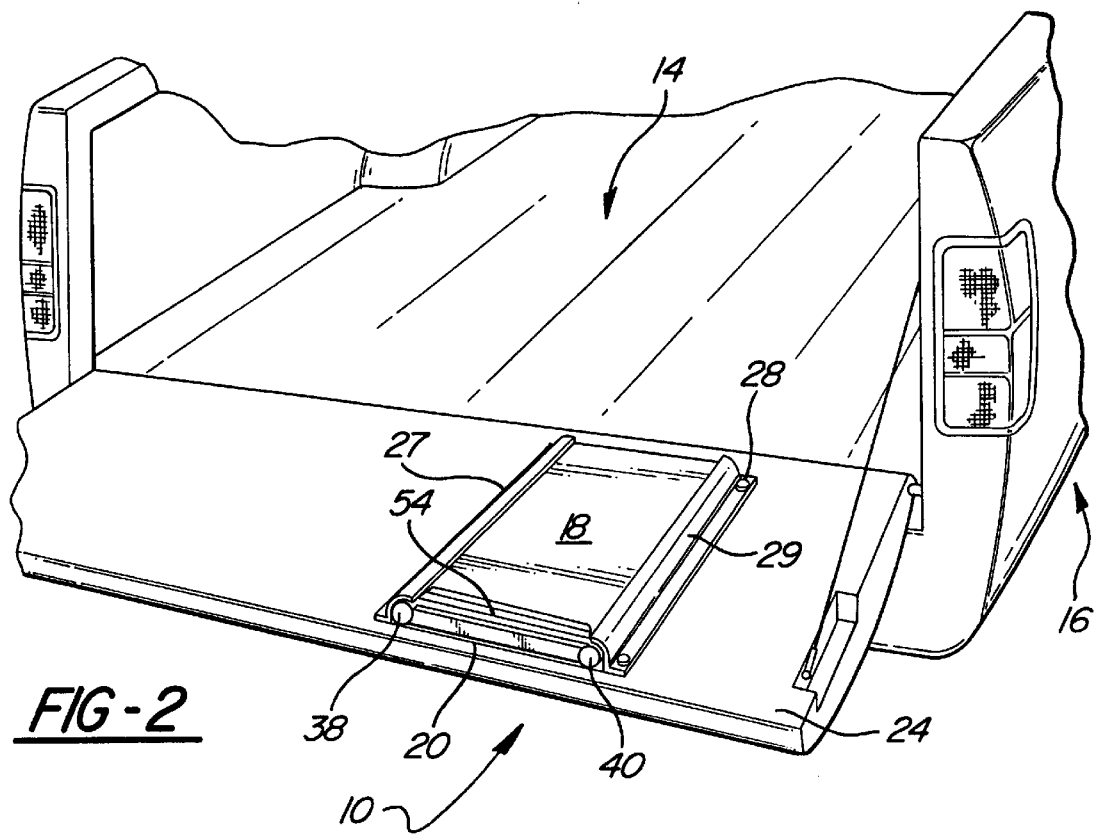
FIG. 2 is a perspective view illustrating the step assembly of FIG. 1 in the stowed position.

Referring specifically to FIG. 3, the tailgate step assembly 10 further includes a U-shaped internal sliding member 30 disposed within the housing 18, and a U-shaped step 32. The sliding member 30 and the step 32 are slidably mounted within the housing 18.

The sliding member 30 includes first 34 and second 36 legs extending from ends of a bight portion 35. Bight portion 35 has a profile which is preferably less than the profile of legs 34, 36. Legs 34, 36 are slidably received by channels 27, 29.

The step 32 includes first 38 and second 40 legs extending from ends of a bight portion 51 which forms a foundation for platform 52. As shown best in FIG. 1, the first 38 and second 40 legs are preferably tubular and are slidingly received within channels 27, 29. The first 38 and second 40 legs may be of any shape. Also, the first 38 and second 40 legs are preferably constructed of materials resistant to environmental degradation.

Figure 4:
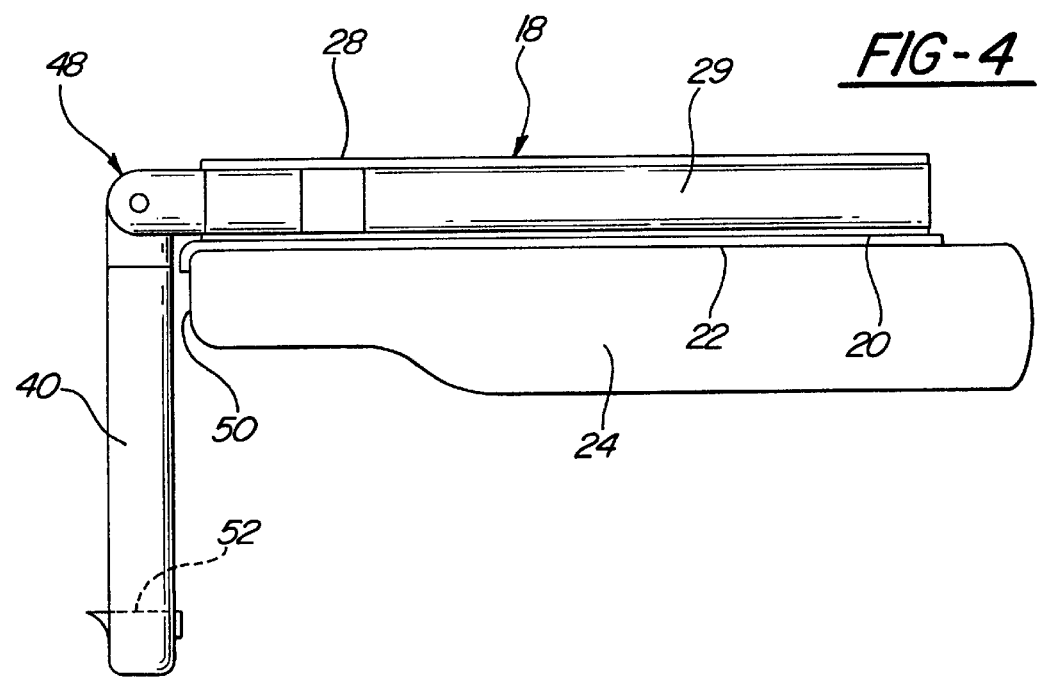
FIG. 4 is a side view of the step assembly in the extended position.

First 46 and second 48 hinges are disposed between the first legs 34, 38 and second legs 36, 40. The first 46 and second 48 hinges permit the step 32 to extend vertically downward when the first 46 and second 48 hinges are positioned at an outer edge 50 of the tailgate 24 (see specifically FIG. 4).

At least one of the hinges 46, 48 is preferably designed to limit rotational movement of the step 32 to about 90° from the plane of the sliding movement of sliding member 30.

The tailgate step assembly 10 optionally includes a step platform 52 extending transversely between the first 38 and second 40 legs. The step platform 52 may be integral to the first 38 and second 40 legs. Optionally, the step platform 52 could be welded the first 38 and second 40 legs thereby establishing a single unitary device.

The step platform 52 is constructed of material suitable to withstand the forces present when the operator 44 is stepping into the truck bed 14 of the pick-up truck 16. Optionally, a traction surface 56 may be disposed on step platform 52. As appreciated, the traction surface enables safe operation of the tailgate step assembly 10 at all times including operation under adverse conditions such as rain or snow.

Sliding member 30 slides within the housing 18 between a stowed position wherein the bight portion 35 abuts against the cover 28 and a deployed position wherein the bight portion abuts against the stop 54 of cover 28.

In the stowed position, the tailgate step assembly 10 is substantially disposed within the housing 18 (best shown in FIG. 3). As a result, the tailgate step assembly 10 has a relatively low profile. Additionally, this low profile of the tailgate step assembly 10 contributes to an overall aesthetically pleasing appearance for the truck bed 14 of the pick-up truck 16. When in the stowed position, the tailgate 24 of the pick-up truck 16 is also typically in a stored position and the tailgate step assembly 10, including the housing 18, is not perceivable by persons positioned behind the pick-up truck 16.

To manipulate the assembly 10 into the open or deployed position, the operator 44, standing outside the truck bed 14, pulls the tailgate step assembly 10 by handling the step platform 52 and pulling the step platform 52 outwardly. As a result, the sliding member 30 of the tailgate step assembly 10 slides within the inner channels 27, 29 of the housing 18 toward the outer edge 50 of the tailgate 24. Correspondingly, the first 34 and second 36 legs and the first 46 and second 48 hinges slide within the inner channels of the housing 18 and extend toward the outer edge 50 of the tailgate 24. As a result, when the pivot point of the first 46 and second 48 hinges extend horizontally beyond the outer edge 50 of the tailgate 24, the first 38 and second 40 legs and the step platform 52 are able to swing downwardly to the deployed or extended position. The step platform 52 is now accessible to the operator 44 for stepping into the truck bed 14 of the pick-up truck 16. Preferably, the first 38 and second 40 legs swing to a position substantially perpendicular to the housing 18. As appreciated, the dimensions of the first 38 and second 40 legs are preferably such that the step platform 52 is in a safe and comfortable position for the operator 44 to step into the truck bed 14.

In order to return the assembly 10 to the closed or stored position, the operator 44 rotates the step platform 52 upwardly such that the first 38 and second 40 legs are now generally horizontal to the inside surface 22 of the tailgate 24 of the pick-up truck 16. If desired, the operator 44 can return the tailgate step assembly 10 to its closed position by pushing the step platform 52 such that the first 38 and second 40 legs align with the inner channels of the housing 18 and slide the legs 38, 40 inwardly. At this point, the operator 44 can also return the tailgate 24 to a closed position thereby containing the tailgate step assembly 10 within the truck bed 14 of the pick-up truck 16. Alternatively, the operator 44 may leave the tailgate 24 in an extended position while maintaining the assembly 10 in the closed position (as shown in FIG. 3). If the tailgate 24 remains in the extended position, the low profile of the housing 18 of the tailgate step assembly 10 maintains the overall aesthetic appearance of the pick-up truck 16.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that the invention may be practiced otherwise as specifically described.

What is claimed:

1. A stowable step comprising:
    a housing defining a slide channel;
    a U-shaped step coupled to said slide channel of said housing;
    a U-shaped sliding member pivotally engaging said step, said sliding member slidably mounted within said slide channel of said housing for reciprocating movement between a retracted stowed position wherein said step and said sliding member substantially extend into and are covered by said housing and a deployed position wherein said step can pivot relative to said sliding member to a substantially vertical position.

2. A stowable step as claimed in claim 1 wherein said U-shaped step includes a first leg and a second leg extending from a first bight portion.

3. A stowable step as claimed in claim 2 wherein said housing has a pair of slide channels for slidably receiving said first and second legs of said U-shaped step in said retracted stowed position.

4. A stowable step as claimed in claim 3 wherein said housing has a stop extending between said pair of slide channels for limiting travel of said sliding member.

5. A stowable step as claimed in claim 4 wherein said housing has a bottom panel configured to be mounted on a tailgate and said stop is positioned to enable said step to extend in said vertical position when said tailgate is in a horizontal position.

6. A stowable step as claimed in claim 5 wherein said sliding member includes first and second legs extending from a second bight portion, said first and second legs slidably disposed in said slide channel and said legs and said second bight portion covered by said housing in each of said retracted stowed position and said deployed position.

7. A stowable step as claimed in claim 6 further includes a first hinge interconnecting said first legs and a second hinge interconnecting said second legs of said step and sliding member for enabling pivotal movement therebetween and wherein at least one of said first and second hinges has a stop for limiting said pivotal movement of said step.

8. A stowable step as claimed in claim 7 wherein said pivotal movement is limited to about 90° from said sliding member.

9. A stowable step as claimed in claim 8 wherein said housing has a low profile.

10. A stowable step as claimed in claim 9 wherein said legs are tubular.

11. A stowable step as claimed in claim 9 wherein said sliding member is tubular.

* * * * *